United States Patent Office 3,493,659
Patented Feb. 3, 1970

3,493,659
COMPOSITIONS AND PROCESS FOR THE PRODUCTION THEREOF
Louis Magid, Clifton, N.J., assignor to Hoffmann-La Roche Inc., Nutley, N.J., a corporation of New Jersey
No Drawing. Filed Oct. 23, 1967, Ser. No. 677,089
Int. Cl. A61j 3/10; A61k 15/00, 15/12
U.S. Cl. 424—280                                    4 Claims

ABSTRACT OF THE DISCLOSURE

Granulations of sodium ascorbate suitable for tabletting by direct compression into high potency sodium ascorbate tablets which have improved color stability on storage.

BACKGROUND OF THE INVENTION

It has long been known that vitamin tablets containing sodium ascorbate are susceptible to discoloration on storage, especially at elevated temperatures. This tendency towards discoloration has assumed special importance in producing a high potency sodium ascorbate-containing tablet due to the tendency of sodium ascorbate to discolor upon handling and storage. In producing tablets of this nature, it was discovered that granulations and tablets containing such high concentrations of sodium ascorbate and having organic binders such as gum acacia, gum karaya, methyl cellulose, hydroxyethyl cellulose, etc., are very susceptible to discoloration on storage, especially when stored at elevated temperatures.

A further disadvantage in preparing vitamin and multivitamin tablets from sodium ascorbate is that these tablets have to be prepared by means of the wet granulation method. In the wet granulation process, the ingredients which enter into the tablet are wetted down with a wetting agent which generally consists of water, alcohol or other organic solvent with or without water, gum or other binder solutions. The tablet ingredients, wetted as above, to the proper consistency are placed in a suitable drying oven. The dried, solid, cohered mass is then milled into granules of the required size, admixed with a suitable lubricant and formed into tablets by compression on a standard tablet press. As can be seen, the wet granulation process is expensive, requiring labor, equipment and expenditure of energy. Moreover, where organic solvents are employed, these are evaporated and seldom recovered, thus adding to the production costs. The use of organic solvents also requires certain safety precautions, e.g., explosion-proof electrical installations such as explosion-proof motors, lighting, sockets, etc., all of which adds further to the cost of production. Additionally, the use of the wet granulation process in preparing multivitamin tablets containing sodium ascorbate, causes discoloration and decomposition of many of the vitamin ingredients in the tablet. Therefore, it has long been desired to prepare a multivitamin and vitamin tablet from sodium ascorbate by means of direct compression.

SUMMARY OF THE INVENTION

It has now been found, in accordance with this invention, that when mixtures containing from about 90% to 97%, by weight of the mixture, of sodium ascorbate and from about 3% to 10%, by weight of the mixture, of pregelatinized starch are granulated, a composition is obtained which when mixed with a lubricant of the type conventionally used in pharmaceutical tabletting operations, can be directly compressed into tablets which have outstanding physical characteristics and which contain high levels of sodium ascorbate. This mixture of sodium ascorbate and pregelatinized starch has exceptional compressibility characteristics which permit it to be compressed into tablets on conventional tabletting equipment without the necessity of prior granulation or slugging steps as in the wet methods of tabletting described hereinabove. Furthermore, the tablets formed from the mixture of this invention do not decompose or discolor even after long periods of storage and handling. Additionally, the composition of this invention can be tabletted along with other vitamins by direct compression to provide multivitamin tablets having a high level of sodium ascorbate which tablets do not discolor or decompose even after long periods of handling and storage.

The term "pregelatinized starch" means starch in its pregelatinized form such as starch sold under such trade names as "OK Pre-Gel," "Instant Clearjel," "Instant Gel" and "Amijel."

DETAILED DESCRIPTION OF THE INVENTION

Sodium ascorbate is commercially available in the form of unground crystals or powders. The sodium ascorbate which is used in the practice of the present invention can be either in the form of unground crystals or powders. Any pregelatinized starch can be utilized in forming the mixture of this invention. Furthermore, the mixture of this invention can, if desired, contain from 0% to 7% by weight, based upon the weight of the mixture, of lactose. Generally, it is preferred to incorporate from about 0.2% to about 7% by weight of lactose.

The compressible mixtures of this invention are readily prepared. As indicated heretofore, the preparative method involves an initial step of forming a granulation of sodium ascorbate and the pregelatinized starch. In production of the granulation, a mixture comprising from about 90% to about 97% by weight of the sodium ascorbate and from about 3% to about 10% by weight of the pregelatinized starch is first prepared. In the preferred embodiment of the invention, the mixture comprises from about 90% to 95% by weight of sodium ascorbate from about 4% to 70% by weight of pregelatinized starch and from about 0.4% to 5% by weight of lactose. In the second step of the process, the sodium ascorbate-pregelatinized starch mixture is granulated in a conventional manner. Water is used as the granulating agent and the quantity employed is variable. Generally, a satisfactory granulation will be obtained using a quantity of water which is equivalent to from about 7% to about 25% by weight of the mixture. The granulation is obtained simply by mixing the liquid granulating agent with the sodium ascorbate-pregelatinized starch mixture. The granulation, thus produced, is, thereafter, passed through a suitable mill or comminuting machine, following which the ground product is dried at an elevated temperature. After drying, the granulation can be, and preferably is, ground or comminuted once again. While the invention is not restrictive thereto, the granulations which are produced in the preferred embodiment are composed of particles, the size of which are distributed approximately as follows: about 0.5% retained on a 16 mesh screen; about 17% retained on a 20 mesh screen; about 37% retained on a 40 mesh screen; about 19% retained on a 60 mesh screen; about 9% retained on a 100 mesh screen; and about 17.5% passing through a 100 mesh screen. As used herein, the expressions 16, 20, 40, 60 and 100 mesh screens denote screens having 16, 20, 40, 60 and 100 openings, respectively, per linear inch.

The compositions described in the preceding paragraph, after the addition of a lubricant thereto, are capable of being compressed into high potency sodium ascorbate tablets having outstanding physical properties and characteristics. In general, any lubricant which is conventionally employed in producing a pharmaceutical tablet can be used. As the lubricant there can be used a stearic acid salt, i.e., a metallic stearate, such as magnesium stearate, calcium stearate, etc. In the alternative, there can be used a wax-like material, for example, a saturated fatty acid, a mixture containing two or more saturated fatty acids or a hydrogenated glyceride, in admixture with a metallic stearate and/or titanium dioxide. Also suitable for use as the lubricant is a mixture of 25% by weight of a metallic stearate, such as, calcium stearate and 75% by weight of corn starch. The quantity of lubricant employed is variable. Generally, however, the lubricant, or lubricant mixture, will comprise from about 0.5% to about 7.0% of the compressible mixture. The lubricant is merely added to, and mixed with, the granulation, following which the mixture is converted into tablets by direct compression methods.

In preparing multivitamin tablets utilizing the mixture of this invention, a granular vitamin composition containing other vitamins and a conventional lubricating agent are added to this mixture prior to direct compression. Any conventional granular vitamin composition utilized in forming multivitamin tablets can be utilized in accordance with this invention. Among the typical vitamins which can be incorporated in multivitamin tablets containing the mixture of this invention are vitamin A, vitamin D, vitamin E, vitamin $B_1$, vitamin $B_{12}$, etc. The resulting mixture can then be fed to and directly compressed on conventional tabletting equipment, e.g., single or rotary tablet punching machines, where tablets of the desired sizes and shapes are compressed in the usual manner.

For a fuller understanding of the nature and objects of this invention, reference may be had to the following examples which are given merely as further illustration of the invention and are not to be construed in a limiting sense. All parts given in the examples are parts by weight unless otherwise indicated.

EXAMPLE 1

A 95% sodium ascorbate granulation was produced from a mixture containing the following ingredients:

| Ingredient: | Parts by weight |
|---|---|
| Sodium ascorbate | 100.00 |
| Pregelatinized starch | 4.00 |
| Lactose U.S.P. | 0.45 |
| Ascorbic acid U.S.P. | 0.25 |

The above mixture was granulated in a Rietz extructor using about 12 parts of distilled water. The wet granulation was dried in a rotary vacuum dryer at about 50° C. under a vacuum of 30 mm. Hg. The dry granulation was then passed through a Fitzpatrick mill, equipped with a No. 2A screen operating at medium speed, with knives forward.

The granulation, produced as described in the preceding paragraph, was admixed with 0.5 parts of calcium stearate. Thereafter, the mixture was compressed at a tablet weight of 570 mg. using a $^{15}\!/_{32}''$ flat-faced, beveled edged, scored punch.

EXAMPLE 2

A 90% sodium ascorbate granulation was produced in the same manner as Example 1 from a mixture containing the following ingredients:

| Ingredient: | Parts by weight |
|---|---|
| Sodium ascorbate | 100.00 |
| Pregelatinized starch | 10.00 |
| Lactose | 0.75 |
| Ascorbic acid | 0.25 |

The 90% sodium ascorbate granulation was admixed with 0.5 part of calcium stearate. Thereafter the mixture was compressed at a tablet weight of 570 mg. using a $^{15}\!/_{32}''$ flat-faced, beveled edged, scored punch.

EXAMPLE 3

1,000 multivitamin tablets were prepared from the 95% sodium ascorbate granulation prepared in Example 1 utilizing the following ingredients:

| Ingredient: | Weight, grams |
|---|---|
| Sodium ascorbate—95% granulation | 116 |
| Thiamine mononitrate—free flow crystals | 11.5 |
| Riboflavin | 5.5 |
| Pyridoxine hydrochloride | 2.2 |
| Calcium pantothenate | 12.2 |
| Niacinamide | 31.5 |
| Vitamin $B_{12}$—gelatin coated 1-100 | 3.6 |
| Vitamin A acetate and $D_2$ [1] | 26.0 |
| Vitamin E acetate—50% potency | 31.5 |
| Avicel [2] | 45.0 |
| Stearic acid | 6.0 |
| $SiO_2$ | 3.0 |

[1] Potency 500,000 units of vitamin A per gram and 50,000 units of vitamin $D_2$ per gram.
[2] Microcrystalline cellulose sold by American Viscose Corp.

All of the above ingredients were mixed and compressed into tablet on a $\%''$ deep cup punch yielding 294 mg. tablets.

EXAMPLE 4

A tablet was prepared from the 90% sodium ascorbate granulation prepared in Example 2 containing the following ingredients:

| Ingredient: | Weight per tablet, mg. |
|---|---|
| Sodium ascorbate—90% granulation | 68 |
| Thiamine mononitrate—free flow crystals | 2.30 |
| Riboflavin | 2.20 |
| Niacinamide | 16.50 |
| Pyridoxine hydrochloride | 2.2 |
| Calcium pantothenate | 6.25 |
| Vitamin $B_{12}$—gelatin coated 1-100 | 2.50 |
| Lactose | 134.65 |
| Avicel | 78.00 |
| Stearic acid | 6.00 |

All of the above ingredients were mixed and compressed on a capsule shaped punch at 315 mg. Each tablet was sealed with 17% shellac solution and dried overnight.

What I claim is:

1. A solid vitamin composition consisting essentially of from about 90 percent to about 97 percent by weight of sodium ascorbate, from 0 to about 7 percent by weight of lactose and from about 3 percent to about 10 percent by weight of pregelatinized starch.

2. The solid vitamin composition of claim 1 wherein the composition contains from about 90 percent to about 95 percent by weight sodium ascorbate, from about 0.2 percent to about 5 percent by weight lactose and from about 4 percent to about 7 percent by weight pregelatinized starch.

3. A method for the preparation of tablets which comprises directly compression into tablets a granular powder consisting essentially of from about 90 percent to about 97 percent by weight of sodium ascorbate, from 0 to about 7 percent by weight lactose and from about 3 percent to about 10 percent by weight of pregelatinized starch in the presence of a lubricating agent.

4. A process for the preparation of multivitamin tablets comprising directly compressing a granular powder consisting essentially of from about 90 percent to about 97 percent by weight of sodium ascorbate, from 0 to about 7 percent by weight of lactose and from about 3 percent to about 10 percent by weight of pregelatinized starch with a granular vitamin preparation in the presence of a lubricating agent.

References Cited

UNITED STATES PATENTS

| | | | |
|---|---|---|---|
| 2,887,437 | 5/1959 | Klioze et al. | 424—280 XR |
| 2,980,589 | 4/1961 | De Grunigen | 424—280 XR |
| 3,034,911 | 5/1962 | McKee et al. | 424—361 XR |
| 3,084,104 | 4/1963 | Tugrck et al. | 424—280 XR |
| 3,175,948 | 3/1965 | Koff et al. | 424—280 XR |
| 3,266,992 | 8/1966 | De Jong | 424—280 XR |
| 3,293,132 | 12/1966 | Stoyle et al. | 424—280 |
| 3,332,848 | 7/1967 | Magid | 424—280 XR |

SHEP K. ROSE, Primary Examiner

U.S. Cl. X.R.

264—122, 123; 424—201, 236, 237, 252, 255, 263, 266, 284, 319, 344, 361, 362